(12) United States Patent
Collins

(10) Patent No.: US 7,385,592 B2
(45) Date of Patent: Jun. 10, 2008

(54) GRAPHIC USER INTERFACE FOR DATA PROCESSING DEVICE

(75) Inventor: Philip David Abdy Collins, Cambridge (GB)

(73) Assignee: QUALCOMM Cambridge Limited, Cambridge (GB)

( * ) Notice: Subject to any disclaimer, the term of this patent is extended or adjusted under 35 U.S.C. 154(b) by 431 days.

(21) Appl. No.: 10/502,125

(22) PCT Filed: Jan. 17, 2003

(86) PCT No.: PCT/GB03/00158

§ 371 (c)(1),
(2), (4) Date: Feb. 22, 2005

(87) PCT Pub. No.: WO03/062978

PCT Pub. Date: Jul. 31, 2003

(65) Prior Publication Data

US 2005/0140661 A1 Jun. 30, 2005

(30) Foreign Application Priority Data

Jan. 18, 2002 (GB) ................................. 0201074.2

(51) Int. Cl.
*G09G 5/00* (2006.01)
(52) U.S. Cl. ...................... 345/173; 715/773; 715/788; 715/798
(58) Field of Classification Search ........ 345/173–178; 178/18.01–18.11; 715/773, 788, 789, 798–801, 715/808, 811, 815, 816, 819, 820, 833, 864
See application file for complete search history.

(56) References Cited

U.S. PATENT DOCUMENTS 5,128,672 A * 7/1992 Kaehler ........................ 341/23

(Continued)

FOREIGN PATENT DOCUMENTS

EP 0272884 6/1988

(Continued)

OTHER PUBLICATIONS

International Search Report, PCT/GB03/000158, International Search Authority EPO, Mar. 8, 2004.

*Primary Examiner*—Jimmy H. Nguyen
(74) *Attorney, Agent, or Firm*—Robert J. O'Connell; Nicholas A. Cole; Thomas Rouse

(57) ABSTRACT

Graphic User Interface for Data Processing Device A hand-held data processing device (82) has a touch-sensitive display screen (84) and interface means for generating a graphic user interface (GUI) on the screen, the GUI having one or more image elements (88, 92, 94, 96, 98, 100, 102), each representing an input. The screen (84) generates a control signal corresponding to an input in response to a portion of the screen on which an image element (88, 92, 94, 96, 98, 100, 102) representing said input is displayed being touched by a user of the device. The device has processing means for processing the control signal. The interface means is operable to locate the image elements (88, 92, 94, 96, 98, 100, 102) on an accessible portion of the screen (84) so that in use the image elements are within reach of a digit (90) of a hand in which the device is held. The image elements may, for example, be located in a fan in a corner of the screen, or in linear fashion along the edges of the screen.

25 Claims, 5 Drawing Sheets

| U.S. PATENT DOCUMENTS | | | | FOREIGN PATENT DOCUMENTS | | |
|---|---|---|---|---|---|---|
| 5,615,384 A | | 3/1997 | Allard | EP | 0412308 | 8/1991 |
| 5,828,360 A | * | 10/1998 | Anderson et al. ............ 715/834 | EP | 0498082 | 8/1991 |
| 5,914,481 A | | 6/1999 | Danielson | EP | 0924915 A1 | 6/1999 |
| 5,996,080 A | * | 11/1999 | Silva et al. ................. 713/320 | EP | 1255187 A2 | 11/2002 |
| 6,011,542 A | * | 1/2000 | Durrani et al. ............. 345/156 | GB | 2380583 A | 4/2003 |
| 6,335,725 B1 | | 1/2002 | Choo et al. | WO | WO-03/021922 A1 | 3/2003 |
| 6,580,442 B1 | * | 6/2003 | Singh et al. ................ 715/840 | | | |
| 6,918,091 B2 | * | 7/2005 | Leavitt et al. .............. 715/765 | * cited by examiner | | |

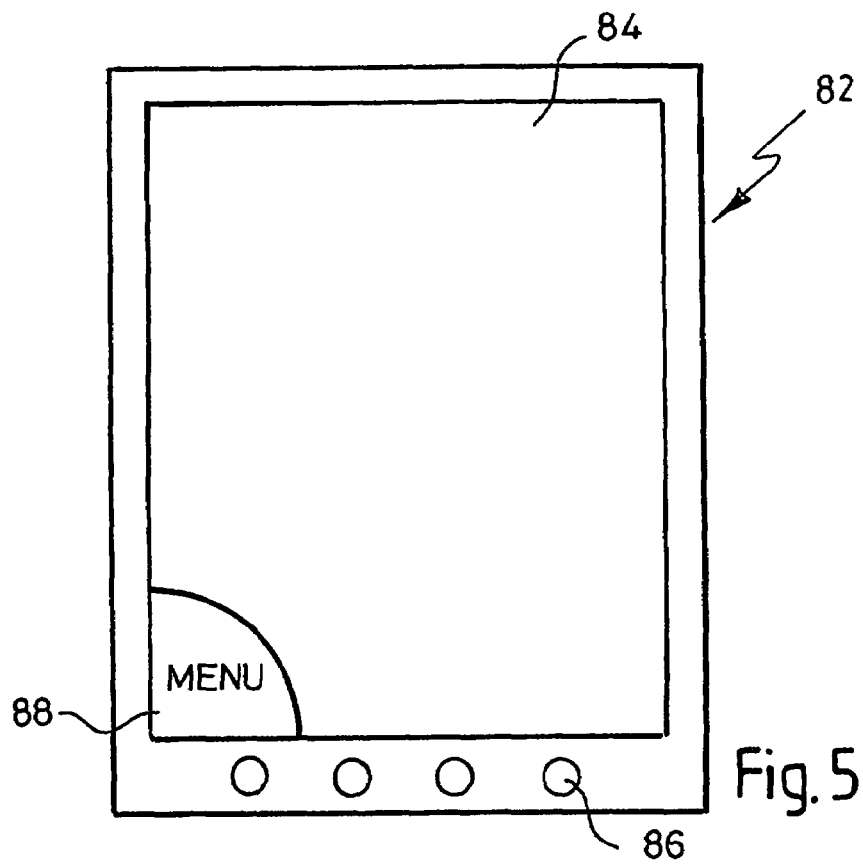
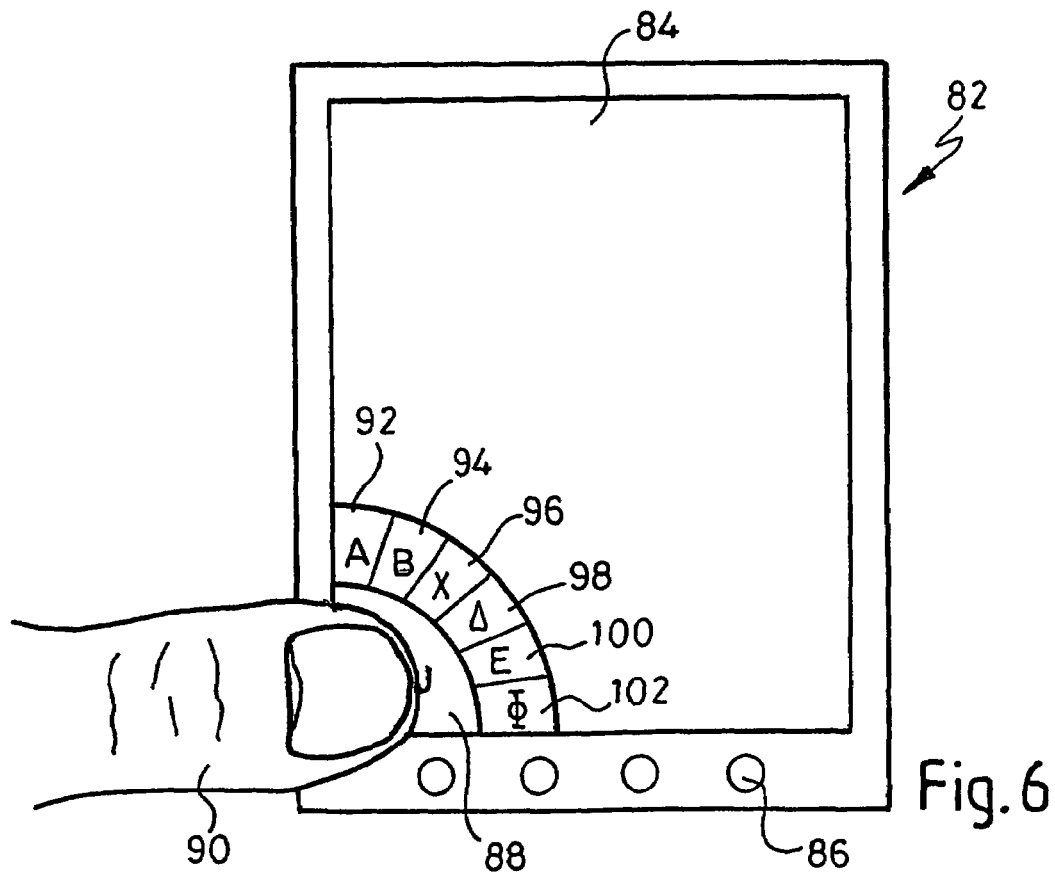

GRAPHIC USER INTERFACE FOR DATA PROCESSING DEVICE

FIELD OF THE INVENTION

This invention relates to a handheld data processing device having a touch-sensitive display screen and interface means for generating a graphic user interface (GUI) on the screen, the GUI having an image element located such that the element may be touched by a thumb or finger of a hand in which the device is held so as to enter a command or an item of data, and relates also to a computer program executable by a handheld data processing device to generate such a GUI.

BACKGROUND TO THE INVENTION

A handheld data processing device such as a mobile telephone or personal digital assistant (PDA) is commonly designed to enable a user thereof to operate a keypad of the device with a thumb or finger of a hand in which the device is held.

It is well known to provide such a device with a touch-sensitive display screen, on certain portions of which images of keys are displayed, the device being operable to perform a function associated with each key in response to the portion of the display screen on which the image of the key is displayed being touched by the user. To date, however, the device has been designed to be held in one of the user's hands, and the display screen touched by a thumb or finger of the user's other hand, or by a stylus held in the user's other hand, and the images of the keys located on the screen in accordance with the assumption that any portion of the display screen may be touched with the same ease as any other portion.

SUMMARY OF THE INVENTION

According to a first aspect of the invention there is provided a handheld data processing device having a touch-sensitive display screen to enable a user of the device to enter an input, the device comprising:
interface means for generating a graphic user interface (GUI) on the screen, the GUI having at least one image element representing an input, and the screen being operable to generate a control signal corresponding to said input in response to a portion of the screen on which the image element is displayed being touched by the user; and
processing means responsive to generation of said control signal to process said input;
characterised in that the interface means is operable to locate the image element on an accessible portion of the screen, so that in use the image element is within reach of a digit of a hand in which the device is held.

In this description the input can be a command, an alphanumeric character, a selection from a menu or any other item of data, and the at least one image element can be a picture, a word or any other suitable indicium.

The invention therefore provides a handheld data processing device having a GUI that enables a wide range of functions to be obtained from the device in a convenient manner. It is also possible for the device to be so arranged that those functions can be obtained using only one hand.

Preferably the accessible portion is so positioned that in use the at least one image element is within reach of the thumb of the hand in which the device is held.

Preferably the GUI has a plurality of image elements representing a respective plurality of inputs, the screen being operable to generate a control signal corresponding to an input in response to a portion of the screen on which the respective image element is displayed being touched by the user, and the interface means being operable to locate the plurality of image elements on the accessible portion of the screen.

Preferably the interface means is operable to locate the at least one image element at, or near to, the periphery of the display screen.

Typically the interface means is operable to locate the at least one image element within 2 cm of the periphery of the display screen.

Preferably, however, the interface means is operable to determine the accessible portion of the display screen, i.e. that portion of the screen which may be reached by a digit of the hand holding the device, and to set the size and location of the at least one image element accordingly.

The interface means may advantageously further be operable to determine whether for a particular user the accessible portion of the screen is larger than average, and accordingly to increase the area of the at least one image element, or where the graphic user interface has a plurality of image elements, to introduce or increase gaps between the elements, to facilitate operation of the device by a user with hands that are larger than average.

The interface means may advantageously be operable to locate the at least one image element in a first location to suit a left-handed user, or in a second location to suit a right-handed user.

Preferably the interface means is operable, in response to the portion of the screen on which a first image element is displayed being touched by the user, to display a second image element on the accessible portion of the screen.

The second image element may advantageously replace the first image element.

The interface means may advantageously further be operable to cause a label associated with the at least one image element to be displayed on a portion of the display screen outside the accessible portion. This enables a large amount of information relating to an input to be displayed on the screen of the device, without increasing the area of the at least one image element and, therefore, without reducing the number of inputs available in the accessible portion of the screen.

Preferably the interface means is operable to associate said label with the at least one image element by means of a lead line.

The device may advantageously further comprise input means, for example in the form of a push-button, the input means being operable to generate a control signal and the interface means being operable in response to said control signal to display on the portion of the screen on which the at least one image element representing a first input was displayed an image element representing a second input.

The interface means may advantageously be operable to cause a first image element representing a default input and a shifted input, and a second image element representing a "shift" input, to be displayed on the screen, the screen being operable to generate a control signal corresponding to the default input in response to the portion of the screen on which the first image element is displayed being touched, and being further operable to generate a control signal corresponding to the shifted input in response to the portions of the screen on which the first and second image elements are displayed being touched at the same time.

Alternatively, or in addition, the interface means may advantageously be operable to cause a first image element representing a default input, and a second image element representing a "shift lock" input, to be displayed on the screen, the screen being operable to generate a control signal corresponding to the "shift lock" input in response to the portion of the screen on which the second image element is displayed being touched, the interface means being responsive to the control signal corresponding to the "shift lock" input to cause a third image element representing a shifted input to be displayed on the screen, and the screen being operable to generate a control signal corresponding to the shifted input in response to the portion of the screen on which the third image element is displayed being touched.

Preferably the interface means is responsive to the control signal corresponding to the "shift lock" input to cause the third image element to be displayed on the screen instead of the first image element.

The interface means may advantageously be responsive to a further control signal corresponding to the "shift lock" input to cause the third image element to be erased from the screen.

Alternatively the interface means may advantageously be responsive to the control signal corresponding to the shifted input to cause the third image element to be erased from the screen.

In either of the aforementioned cases, the interface means is preferably operable also to cause the first image element to be displayed in place of the erased third image element.

The display screen may advantageously be operable to generate a first control signal in response to the user touching a portion of the screen in which an image element representing an input is displayed, and a second control signal in response to the user removing his digit from the display screen.

Preferably the processing means is operable to process the input only in response to generation of the first control signal followed by the second control signal.

Preferably the interface means is operable in response to said first control signal to display on a portion of the screen outside the accessible portion an image representing the input, and to remove said image in response to the processing means processing the input.

In this way the device can provide an indication of which image element is being touched by the user's digit, helping the user to avoid entering erroneous inputs, since the image element, and perhaps neighbouring image elements, may be wholly or partially obscured by the digit.

In preferred embodiments of the invention the touch-sensitive display screen is generally rectangular.

In a first embodiment the interface means is preferably operable to cause a first plurality of image elements to be displayed along a first edge of the screen such that they may be touched by the thumb of a first hand in which the device is held.

Preferably the interface means is further operable to cause a second plurality of image elements to be displayed along a second edge of the screen such that they may be touched by the thumb of a second hand in which the device is held.

The interface means may advantageously be operable to locate the first and second pluralities of image elements along opposite edges of the display screen, and preferably along the left and right edges of the screen such that the elements may be activated by the thumbs of a user's left and right hands, respectively, in which the device is held.

The first and/or second plurality of image elements may advantageously include an element representing a "more" input and elements representing a selection of inputs from a plurality of available inputs, the display screen being operable to generate a control signal to cause the selection of inputs to change in response to the portion of the screen on which the image element representing the "more" input is displayed being touched by the user.

Preferably the first and/or second plurality of image elements includes elements representing "scroll up" and "scroll down" inputs and a vertical list of elements representing a selection from a list of available inputs, the screen being operable to generate control signals to cause the vertical list of elements to be replaced by a vertical list of elements representing another selection from the list of available inputs, in response to the portion of the screen on which the image element representing the "scroll up" or "scroll down" input is displayed being touched by the user, as if the list of available inputs were present beneath the device and a portion of the vertical list were visible through the vertical list of elements, and touching the portions of the screen on which the the image elements representing the "scroll up" and "scroll down" inputs are displayed caused the list to move down and up, respectively, relative to the device.

Preferably the image elements are representations of keys.

In a second embodiment the interface means is preferably operable to generate a graphic user interface having a single image element representing a "menu" input, the screen being operable to generate a control signal corresponding to the "menu" input in response to the portion of the screen on which the element representing the "menu" input is displayed being touched by the user, and the interface means being operable to display a plurality of image elements on the accessible portion of the screen in response to generation of the control signal corresponding to the "menu" input.

Preferably the single image element is located at a bottom corner of the display screen.

The interface means may advantageously be operable to display the plurality of elements in the accessible portion of the screen adjacent to the single image element.

Preferably the interface means is operable to display the plurality of elements in a first curve adjacent to the single image element.

The interface means may advantageously further be operable to display a further plurality of elements in the accessible portion of the screen in a second curve adjacent to the first curve.

Preferably the first and/or second plurality of elements includes elements representing "scroll clockwise" and "scroll anticlockwise" inputs and a sector of elements arranged as a sector of a ring and representing a selection from a list of available inputs, the display screen being operable to generate control signals to cause the sector of elements to be replaced by a sector of elements representing another selection from the list of available inputs, in response to the portion of the screen on which the element representing the "scroll clockwise" or "scroll anticlockwise" input is displayed being touched, as if a virtual ring of inputs were present beneath the device and a sector of the virtual ring were visible through the sector of elements, and touching the portions of the screen on which the elements representing the "scroll clockwise" and "scroll anticlockwise" inputs are displayed caused the virtual ring to rotate anticlockwise and clockwise, respectively, relative to the device.

Preferably the image elements are representations of keys.

According to a second aspect of the invention there is provided a computer program for execution by a handheld data processing device having a touch-sensitive display screen, interface means for generating a GUI and processing means, the program being executable by the processing means to cause the interface means to generate a GUI having at least one image element representing an input, and to process a control signal corresponding to the input generated by the screen in response to the portion of the screen on which the at least one image element is displayed being touched, characterised in that the program is executable by the processing means to cause the interface means to locate the at least one image element on an accessible portion of the screen such that the element may be touched by a digit of a hand in which the device is held.

Preferably the computer program is further executable by the interface means to determine the accessible portion of the display screen, and to set the size and location of the at least one image element accordingly.

The invention will now be described in greater detail by way of illustrative examples and with reference to the accompanying drawings, in which:

FIG. 5 is a plan view of a further embodiment of a PDA in accordance with the first aspect of the invention; and FIGS. 6 to 10 are plan views of the PDA of FIG. 5 showing different states of the GUI.

DETAILED DESCRIPTION OF EMBODIMENTS

Figure 1:
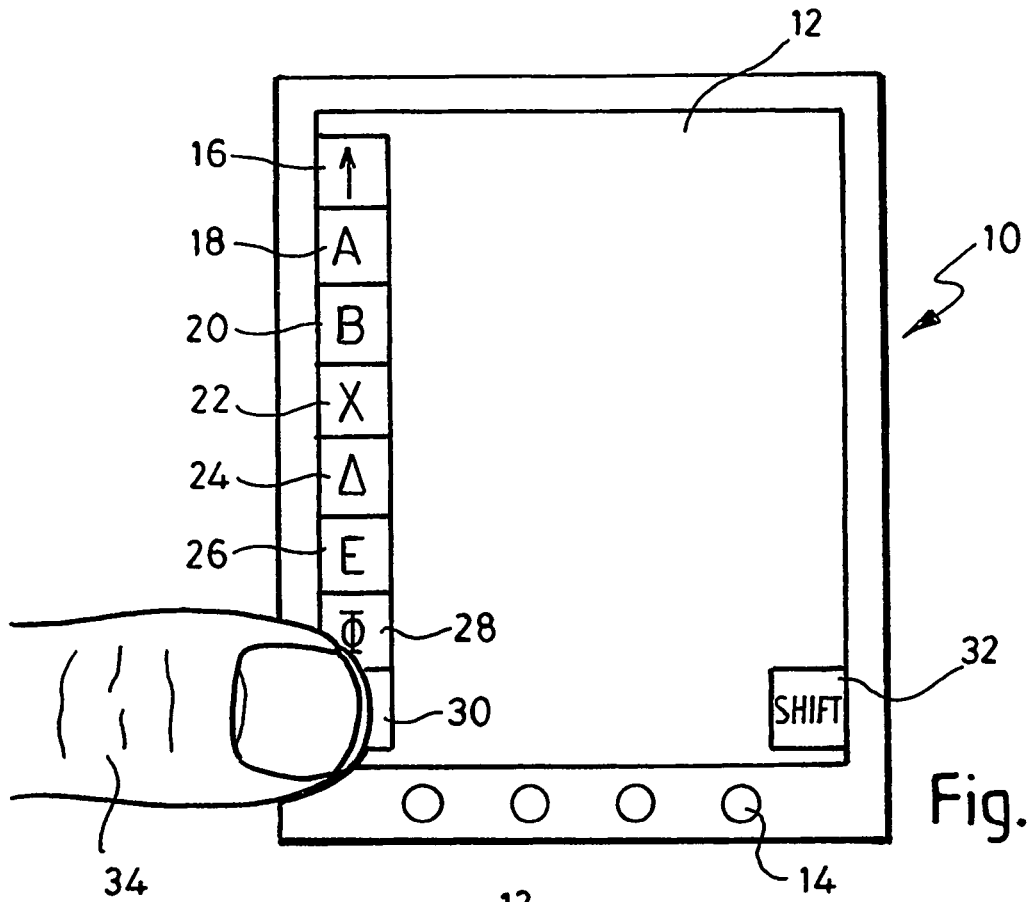
FIG. 1 is a plan view of a first embodiment of a personal digital assistant (PDA) in accordance with the first aspect of the invention.

The personal digital assistant (PDA) 10 of FIG. 1 is a first embodiment of the invention, having a touch-sensitive display screen 12 and four push-buttons, including a shift push-button 14. The PDA has a memory and a microprocessor, neither of which is shown, and the structure and operation of which are well understood by those skilled in the art. The memory contains a first graphic user interface (GUI) program executable by the microprocessor to generate a GUI on the display screen 12.

In FIG. 1 the GUI comprises image elements in the form of representations of keys. Keys 16 to 30 are displayed along the left edge of the screen, and key 32 at the lower right edge of the screen. Keys 16 and 30 are "scroll up" and "scroll down" keys respectively, keys 18 to 28 are master menu keys, and key 32 is a shift key operable to change the functions associated with the master menu keys.

FIG. 1 also shows the thumb 34 of a left hand that is holding the PDA.

Each of the "scroll up", "scroll down" and shift keys 16, 30 and 32 is operated by touching the portion of the screen on which the key is displayed with the thumb 34. Each of the master menu keys 18 to 28, on the other hand, is operated by touching the portion of the screen on which the key is displayed with the thumb 34 and then removing said thumb from the screen. In FIG. 1 the thumb 34 is operating the "scroll down" key 30.

In a further embodiment of the invention, not shown in the drawing figures, the shift key is displayed at the left edge of the screen with the master menu, "scroll up" and "scroll down" keys so as to facilitate one-handed operation of the PDA.

Figure 2:
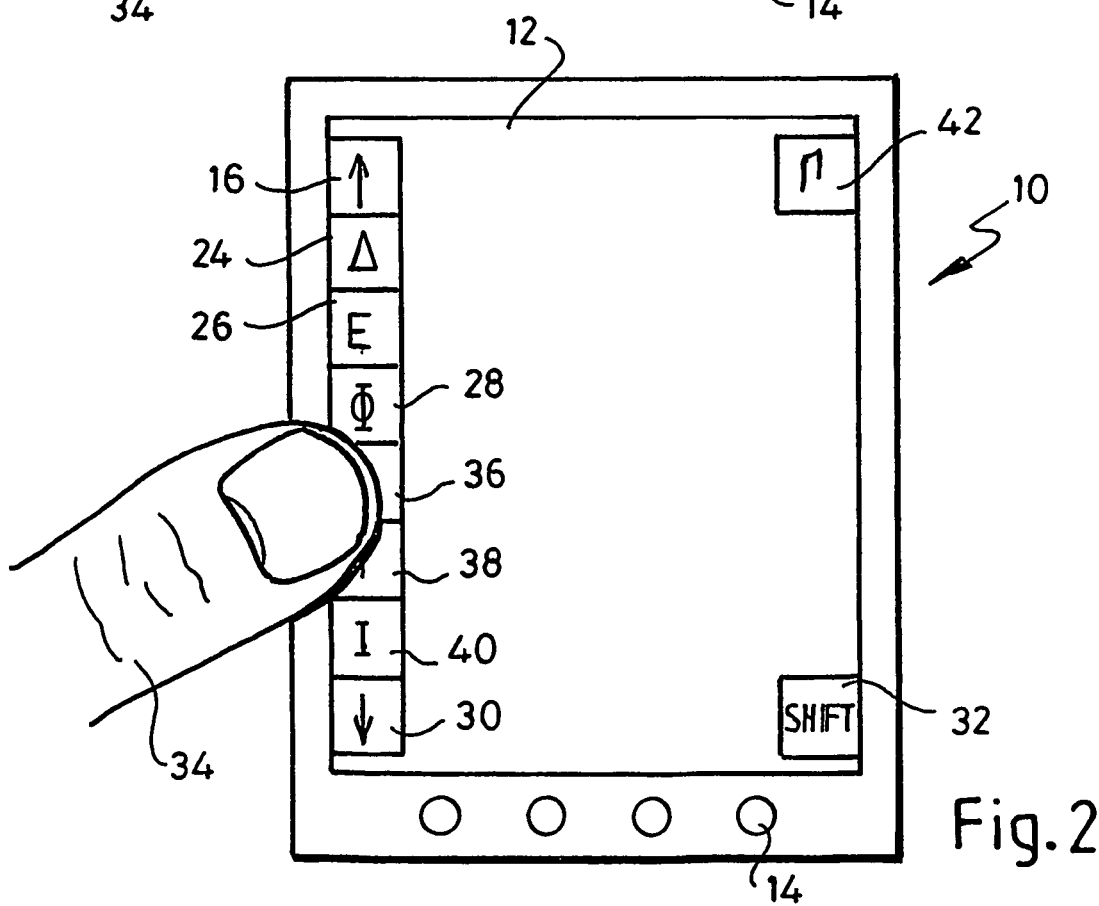
FIGS. 2 to 4 are plan views of the PDA of FIG. 1 showing different states of the GUI.

In FIG. 2 master menu keys 24 to 28 are displayed towards the top of the screen 12 as a result of the operation of the "scroll down" key 30, replacing master menu keys 18 to 22. New master menu keys 36 to 40 are displayed along the left edge of the screen 12.

The thumb 34 is touching the master menu key 36. While the thumb remains on the key 36, a representation of key 36 is displayed in a window 42 at the upper right corner of the screen. If the thumb were to be slid onto either of neighbouring keys 28 or 38, a representation of the respective key would be displayed in the window 42. The key represented in the window 42 is operated when the thumb 34 is removed from the screen. The user of the PDA is therefore provided with a visual indication of the location of his thumb relative to the keys, since the key he wishes to operate, and possibly also neighbouring keys, may be obscured by his thumb.

Figure 3:
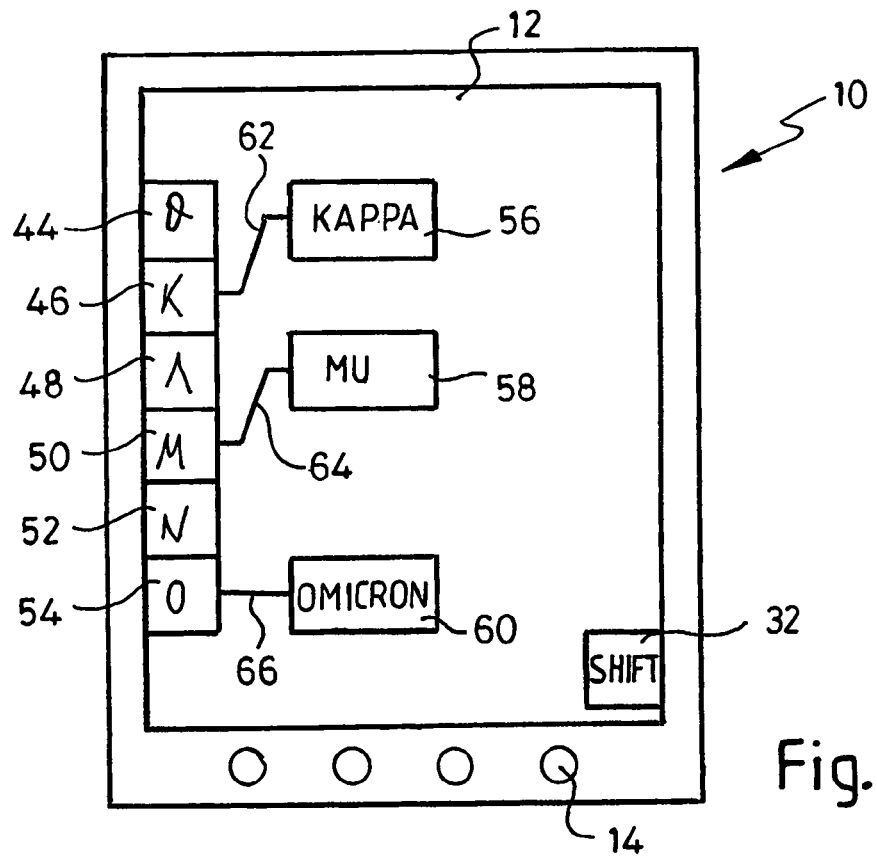

In FIG. 3 the thumb 34 has been removed from the screen, thereby operating master menu key 36 and causing sub-menu keys 44 to 54 to be displayed along the left edge of the screen, replacing master menu keys 24 to 28 and 36 to 40. Sub-menu keys 44 to 54 constitute an entire sub-menu, so the "scroll up" and "scroll down" keys 16 and 30 are unnecessary and are therefore removed from the GUI.

FIG. 3 shows three windows 56 to 60 in the middle portion of the screen. The windows contain explanations of the functions of sub-menu keys 46, 50 and 54 respectively and the association of each window with its sub-menu key is indicated by a respective lead line 62, 64 and 66. The windows 56 to 60 serve to clarify the operation of the PDA whilst avoiding crowding of the accessible portion of the screen.

Figure 4:
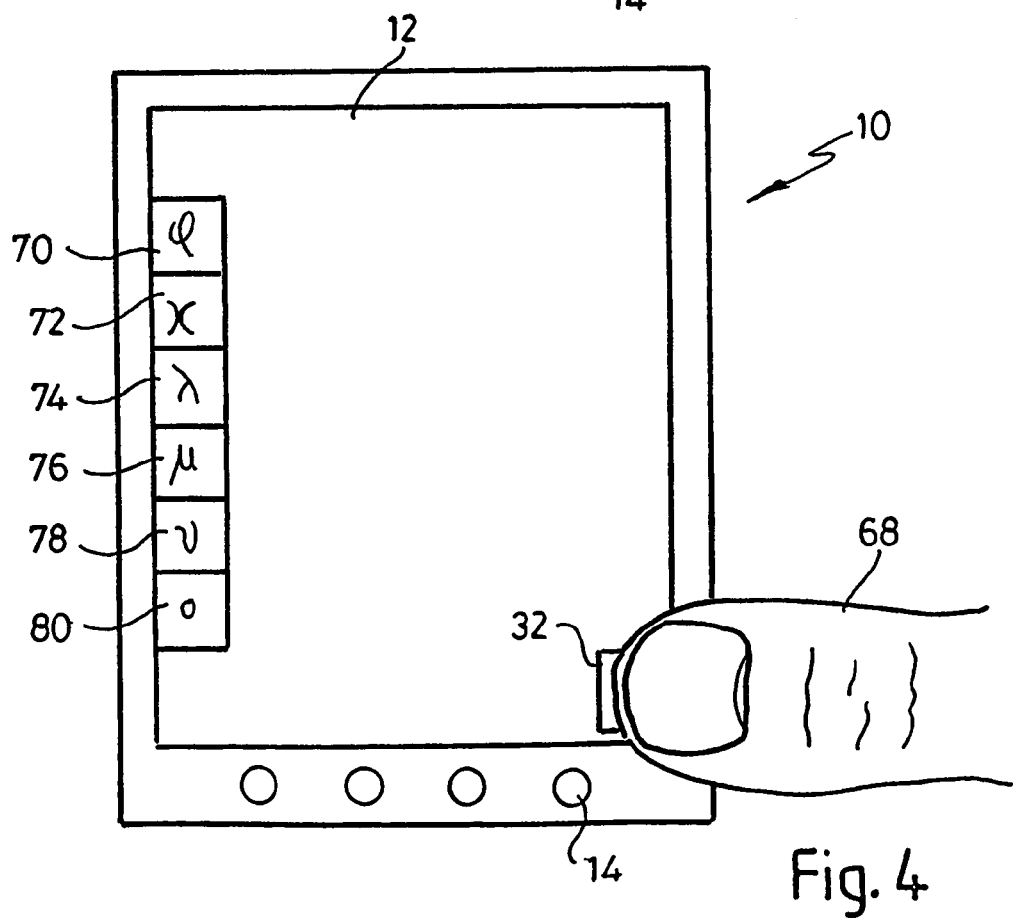

In FIG. 4 the thumb 68 of a right hand in which the PDA is held is shown touching the portion of the screen on which the shift key 32 is displayed, causing shifted sub-menu keys 70 to 80 to be displayed along the left edge of the screen instead of sub-menu keys 44 to 54. The shifted sub-menu keys could also have been caused to be displayed by the thumb 68 pressing the shift push-button 14.

Touching the portion of the screen on which one of shifted sub-menu keys 70 to 80 is displayed operates the shifted sub-menu key, causing the microprocessor to carry out the function associated with the key, and causing sub-menu keys 44 to 54 to be displayed instead of shifted sub-menu keys 70 to 80. The shifted sub-menu keys 70 to 80 are therefore displayed in response to the shift key 32 being operated until one of the shifted sub-menu keys is operated, whereupon the sub-menu keys 44 to 54 are displayed instead of the shifted sub-menu keys 70 to 80.

In a further embodiment, not shown in the drawing figures, the shift key has a "shift lock" function. Touching the portion of the screen on which the shift key is displayed causes shifted sub-menu keys to be displayed instead of sub-menu keys. Touching the portion of the screen on which one of the shifted sub-menu keys is displayed operates the shifted sub-menu key, causing the microprocessor to carry out the function associated with the shifted sub-menu key. Touching the portion of the screen on which the shift key is displayed while the shifted sub-memu keys are displayed operates the shift key, causing the sub-menu keys to be displayed instead of the shifted sub-menu keys. The shifted sub-menu keys are therefore displayed in response to the shift key being operated until the shift key is operated again, regardless of whether any of the shifted sub-menu keys is operated.

The PDA 82 of FIG. 5 is yet a further embodiment of the invention, having a touch-sensitive display screen 84, four push-buttons, including a shift push-button 86, and a memory and microprocessor, neither of which is shown. The PDA 82 is identical with the PDA 10 of FIGS. 1 to 4, except that the memory contains a second GUI program executable by the microprocessor instead of the first GUI program.

In FIG. 5 the GUI of the PDA comprises a menu start key 88 in the lower left corner of the screen 84. The menu start key 88 is operated simply by touching the portion of the screen on which the key is displayed with a thumb, rather than by touching then removing the thumb from the screen.

In FIG. 6 the thumb 90 of a left hand in which the PDA is held is shown touching the menu start key 88, causing master menu keys 92 to 102 to be displayed in an inner curve adjacent to the start menu key 88.

Figure 7:
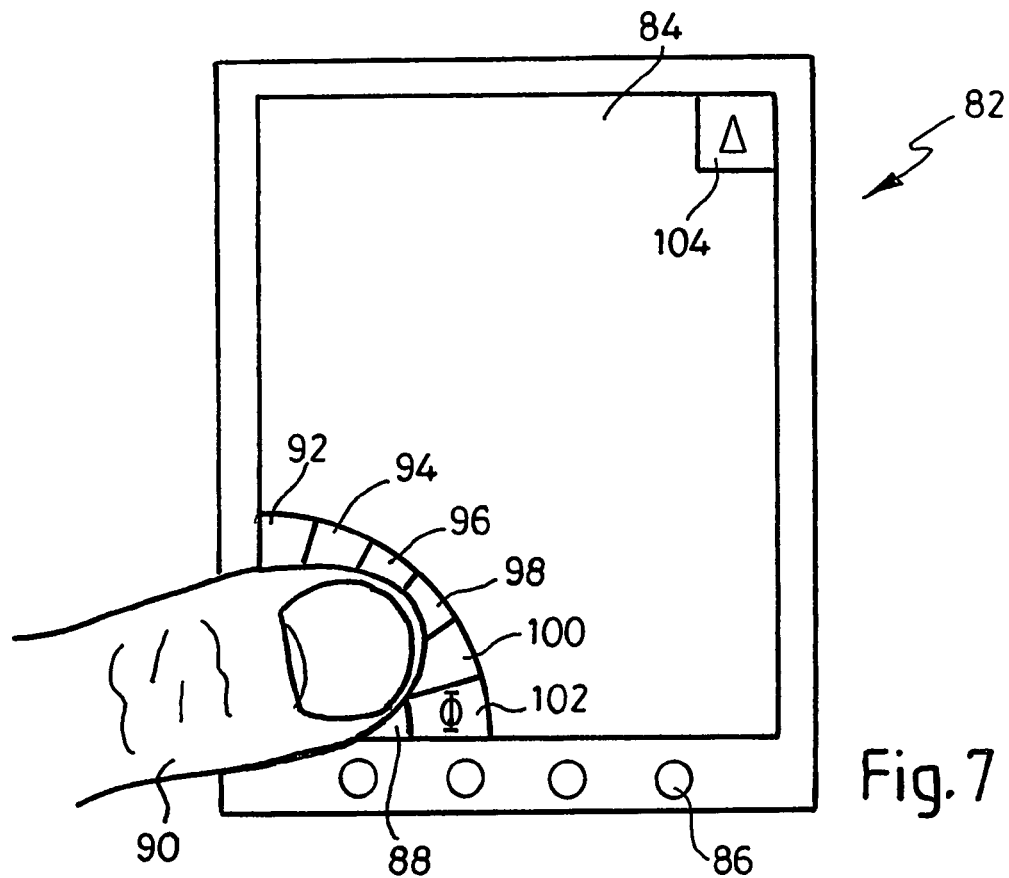
Figure 8:
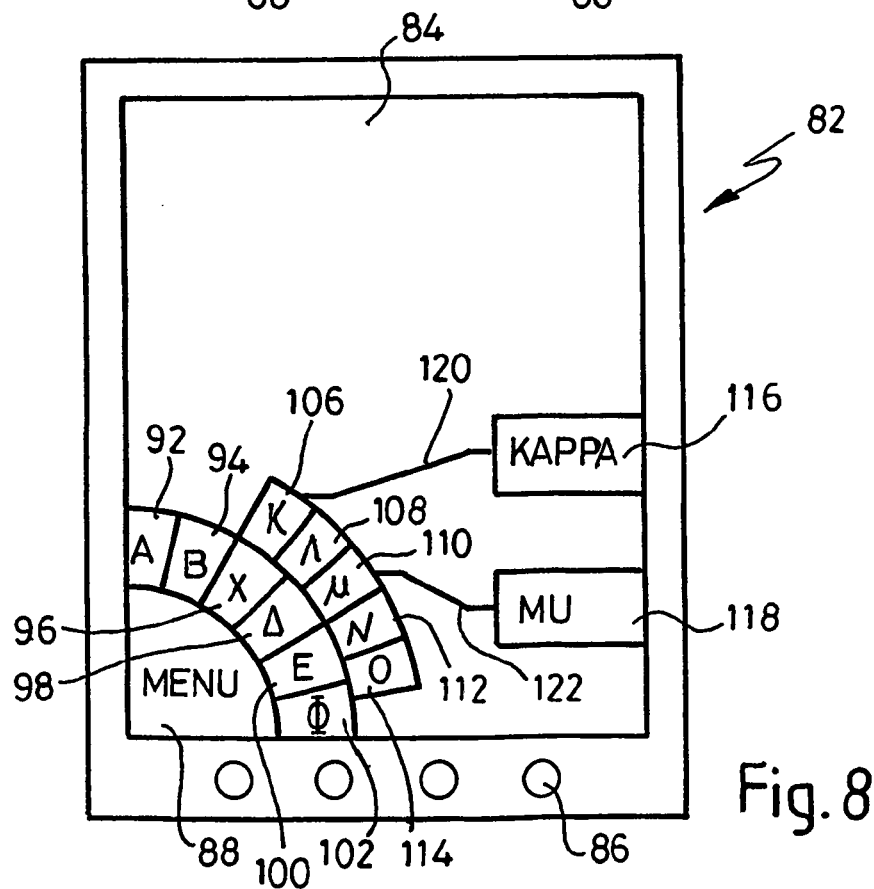

In FIG. 7 the thumb 90 is touching master menu key 98, causing a representation of master menu key 98 to be displayed in a window 104 in the upper right corner of the screen. When the thumb 90 is removed from the screen the window 104 is removed from the GUI and the key 98 is operated, causing sub-menu keys 106 to 114 to be displayed in an outer curve adjacent to master menu keys 92 to 102, as shown in FIG. 8.

Windows 116 and 118 containing explanation of the functions of sub-menu keys 106 and 110 respectively are displayed along the right edge of the screen, and the association of each window with its sub-menu key is indicated by a respective lead line 120 and 122.

The shift push-button 86 is operable by the thumb 90 to cause a set of shifted master menu or shifted sub-menu keys to be displayed in the inner or outer curve, respectively, instead of the master menu keys 92 to 102 or sub-menu keys 106 to 112, provided that such a shifted menu is available, otherwise shift push-button 86 has no effect.

Figure 9:
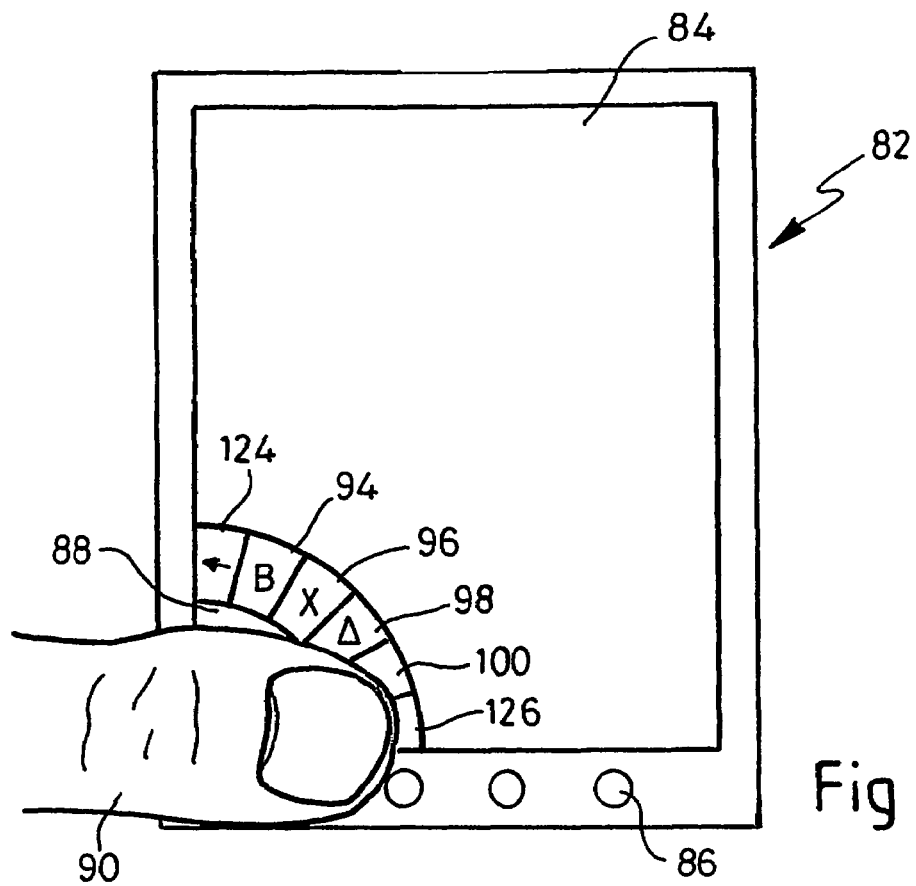

FIG. 9 shows a slightly different mode of operation of the GUI, which occurs when a master menu or sub-menu contains more items than can be accommodated within the inner or outer curve, respectively. In the present example, the master menu contains more items than can be accommodated within the inner curve. The master menu keys 92 and 102 are replaced by "scroll anticlockwise" and "scroll clockwise" keys 124 and 126 respectively, while master menu keys 94 to 100 remain in place.

In FIG. 9 the thumb 90 is shown touching the "scroll clockwise" key 126.

Figure 10:
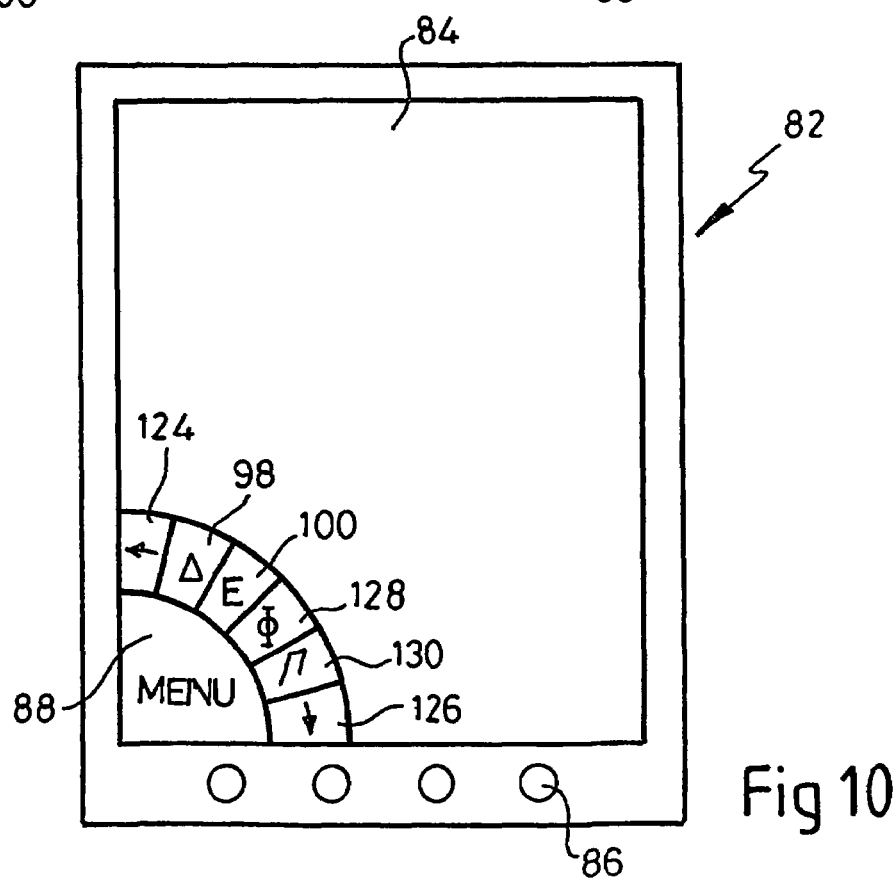

In FIG. 10 the master menu keys 98 and 100 are displayed adjacent to the "scroll anticlockwise" key 124, as a result of the operation of the "scroll clockwise" key 126, replacing the master menu keys 94 and 96, and new master menu keys 128 and 130 are displayed adjacent to the "scroll clockwise" key 126.

The GUI program contained in the memory of each embodiment of the invention is further executable to adapt the GUI to the size of the hand of the user of the PDA. The operation of the program contained in the memory of the first embodiment is as follows:

1. the user is requested to enter whether he is left- or right-handed;
2. the user is requested to hold the PDA in both hands and to slide his left and right thumbs along the left and right sides, respectively, of the screen;
3. the PDA determines the mean distance from the left edge of the screen reached by the thumb of the user's left hand, and the mean distance from the right edge of the screen reached by the thumb of the user's right hand;
4. the PDA defines left and right accessible portions of the screen, consisting of rectangular areas at the left and right edges of the screen of the same widths as the mean distances from the left and right edges, respectively, of the screen reached by the thumbs of the user's left and right hands, respectively, and of the same length as the screen;
5. depending on the entry made by the user at step 1, the PDA determines whether the more frequently used keys should be located in the left or right accessible portion; and
6. the PDA scales the keys making up the GUI so as to fill the accessible portions of the screen.

The operation of the program contained in the memory of the embodiment shown in FIGS. 5 to 10 is as follows:

1. the user is requested to hold the PDA in the hand with which he wishes to operate the PDA, and to make a curvilinear sweeping movement with his thumb across the lower corner of the screen nearer to his thumb;
2. the PDA determines the mean distance from the lower corner of the screen nearer to the user's thumb reached by the thumb;
3. the PDA defines an accessible portion of the screen, consisting of a quadrant of a circle having a radius equal to the mean distance reached by the thumb and centred on the lower corner of the screen nearer to the thumb;
4. the PDA scales the keys making up the GUI so as to fill the accessible portion of the screen.

It will be apparent that the above description relates only to four embodiments of the invention, and that the invention encompasses other embodiments as defined by the foregoing summary of the invention.

The invention claimed is:

1. A handheld data processing device having a screen to enable a user of the device to enter an input, wherein the screen is touch-sensitive, the device comprising: interface means for generating a graphic user interface (GUI) on the screen, the GUI having a plurality of image elements representing a plurality of inputs, and the screen being operable to generate one of a plurality of control signals corresponding to one of the plurality of inputs in response to a portion of the screen on which the one of the plurality of image elements is displayed being touched by the user; and processing means responsive to generation of the each one of the plurality of control signals to process the corresponding input; characterised in that the interface means is operable to:
   receive an input on the screen from a user's digit of a hand in which the device is held;
   determine a mean distance on the screen reachable by the user's said digit;
   define an accessible portion of the screen as being an area on the screen within the mean distance;
   locate the plurality of image elements on the accessible portion of the screen, so that the plurality of image elements are within reach of the user's said digit; and
   scale the plurality of image elements so as to not exceed the accessible portion of the screen.

2. A device according to claim 1, wherein the accessible portion is so positioned that all of the plurality of image elements are within reach of the thumb of the hand in which the device is held.

3. A device according to claim 1, wherein the interface means is operable to generate a GUI having a single image element representing a "menu" input, the screen is operable to generate a control signal corresponding to the "menu" input in response to the portion of the screen on which the element representing the "menu" input is displayed being touched by the user, and the interface means is operable to display the plurality of image elements on the accessible portion of the screen in response to generation of the control signal corresponding to the "menu" input.

4. A device according to claim 3, wherein: the screen is generally rectangular;

the mean distance on the screen reachable by the user's said digit is measured from a bottom corner nearer to the user's said digit; and
the single image element is located at the bottom corner of the screen.

5. A device according to claim 3, wherein the interface means is operable to display the plurality of image elements in the accessible portion of the screen adjacent to the single image element.

6. A device according to claim 5, wherein the interface means is operable to display the plurality of image elements in a first curve adjacent to the single image element.

7. A device according to claim 6, wherein the interface means is operable to display a further plurality of image elements in the accessible portion of the screen in a second curve adjacent to the first curve.

8. A device according to claim 3, wherein the plurality of image elements includes image elements representing "scroll clockwise" and "scroll anticlockwise" inputs and a sector of image elements arranged as a sector of a ring and representing a selection from a list of available inputs, and the screen is operable to generate control signals to cause the sector of image elements to be replaced by a sector of image elements representing another selection from the list of available inputs, in response to the portion of the screen on which the image element representing the "scroll clockwise" or "scroll anticlockwise" input is displayed being touched.

9. A device according to claim 8, wherein the screen is operable to cause the sector of image elements to be replaced by a sector of image elements representing another selection from the list of available inputs, as if a virtual ring of inputs were present beneath the device and a sector of the virtual ring were visible through the sector of image elements, and touching the portions of the screen on which the image elements representing the "scroll clockwise" and "scroll anticlockwise" inputs are displayed caused the virtual ring to rotate anticlockwise and clockwise, respectively, relative to the device.

10. A device according to claim 1, wherein the touch-sensitive screen is generally rectangular;
the mean distance on the screen reachable by the user's said digit is measured from a first edge of the screen nearer to the thumb of the user's first hand; and
the interface means is operable to cause the plurality of image elements to be displayed as a first plurality of image elements along the first edge of the screen such that said first plurality of image elements is operable to be touched by the thumb of the first hand in which the device is held.

11. A device according to claim 10, wherein the interface means is operable to:
receive an input of a second thumb on the user's second hand on the screen;
determine a second mean distance from a second edge of the screen reachable by the user's second thumb;
define a second accessible portion of the screen as being an area on the screen within the second mean distance;
cause a second plurality of image elements to be displayed along the second edge of the screen such that said second plurality of image elements is operable to be touched by the second thumb of second hand in which the device is held; and
scale the second plurality of image elements so as to not exceed the second accessible portion of the screen.

12. A device according to claim 11, wherein the first and/or second plurality of image elements includes image elements representing "scroll up" and "scroll down" inputs and a vertical list of image elements representing a selection from a list of available inputs, and the screen is operable to generate control signals to cause the vertical list of image elements to be replaced by a vertical list of image elements representing another selection from the list of available inputs, in response to the portion of the screen on which the image element representing the "scroll up" or "scroll down" input is displayed being touched by the user.

13. A device according to claim 12, wherein the screen is operable to cause the vertical list of image elements to be replaced by a vertical list of image elements representing another selection from the list of available inputs as if the list of available inputs were present beneath the device and a portion of the vertical list were visible through the vertical list of image elements, and touching the portions of the screen on which the image elements representing the "scroll up" and "scroll down" inputs are displayed caused the list to move down and up, respectively, relative to the device.

14. A device according to claim 1, wherein the interface means is operable to cause a label associated with at least one of the plurality of image elements to be displayed on a portion of the screen outside the defined accessible portion.

15. A device according to claim 14, wherein the interface means is operable to associate the label with the at least one of the plurality of image elements by means of a lead line.

16. A device according to claim 1, farther comprising input means operable to generate a further control signal, wherein the interface means is operable in response to the farther control signal to display on the accessible portion of the screen an image element representing a second input.

17. A device according to claim 1, wherein the screen is operable to generate a first control signal in response to the user touching the screen on one of the plurality of image elements with the user's said digit, and a second control signal in response to removing the user's said digit from the screen, and the processing means is operable to process the input only in response to generation of the first control signal followed by the second control signal.

18. A device according to claim 17, wherein the interface means is operable in response to the first control signal to display on a portion of the screen outside the defined accessible portion an image representing the input, and to remove the image in response to the processing means processing the input.

19. A memory having stored thereon a computer program for execution by a handheld data processing device having a screen, wherein the screen is touch-sensitive, interface means for generating a GUI and processing means, the program being executable by the processing means to cause the interface means to generate a GUI including a plurality of image elements representing a plurality of inputs, and to process one of a plurality of control signals corresponding to one of the plurality of inputs generated by the screen in response to a portion of the screen on which the one of the plurality of image elements is displayed being touched, characterised in that the program is executable by the processing means to cause the interface means to:
receive an input on the screen from a user's digit of a hand in which the device is held;
determine a mean distance on the screen reachable by the user's said digit;
define an accessible portion of the screen as being an area on the screen within the mean distance;
locate the plurality of image elements on the accessible portion of the screen such that the plurality of image elements are within reach of the user's said digit; and scale the plurality of image elements so as to not exceed the accessible portion of the screen.

20. A method for generating a graphical user interface including a plurality of image elements on a touch-sensitive screen of a device, comprising:
receiving an input on the screen from a user's digit on a hand in which the device is held;
determining a mean distance on the screen reached by the user's said digit;
defining an accessible portion of the screen as being an area on the screen within the mean distance;
locating the plurality of image elements on the accessible portion of the screen so that the plurality of image elements are within reach of the user's said digit; and
scaling the plurality of image elements so as to not exceed the accessible portion of the screen.

21. The method of claim 20, wherein:
the mean distance is measured from an edge of the screen; and
the plurality of image elements are arrayed along the edge within the accessible portion of the screen.

22. The method of claim 20, wherein:
the mean distance is measured from corner of the screen; and
the plurality of image elements are arrayed in a quadrant of a circle having a radius equal to the mean distance and centered on the corner of the screen.

23. A handheld data processing device, comprising:
means for generating a graphical user including a plurality of image elements on a touch-sensitive screen of the handheld data processing device;
means for receiving an input on the touch-sensitive screen from a user's digit on a hand in which the device is held;
means for determining a mean distance on the touch-sensitive screen reached by the user's said digit;
means for defining an accessible portion of the touch-sensitive screen as being an area on the touch-sensitive screen within the mean distance;
means for locating the plurality of image elements on the accessible portion of the touch-sensitive screen so that the plurality of image elements are within reach of the user's said digit; and
means for scaling the plurality of image elements so as to not exceed the accessible portion of the screen.

24. The handheld data processing device of claim 23, wherein:
the mean distance is measured from an edge of the touch-sensitive screen; and
the plurality of image elements are arrayed along the edge within the accessible portion of the touch-sensitive screen.

25. The handheld data processing device of claim 23, wherein:
the mean distance is measured from corner of the touch-sensitive screen; and
the plurality of image elements are arrayed in a quadrant of a circle having a radius equal to the mean distance and centered on the corner of the touch-sensitive screen.

* * * * *